United States Patent [19]

Hansler et al.

[11] 4,389,201
[45] Jun. 21, 1983

[54] METHOD OF MANUFACTURING A LAMP

[75] Inventors: Richard L. Hansler, Pepper Pike; Elmer G. Fridrich, Chardon, both of Ohio

[73] Assignee: General Electric Company, Schenectady, N.Y.

[21] Appl. No.: 231,655

[22] Filed: Feb. 5, 1981

Related U.S. Application Data

[63] Continuation-in-part of Ser. No. 19,647, Mar. 12, 1979, abandoned.

[51] Int. Cl.³ .............................. H01J 9/40; H01J 9/46
[52] U.S. Cl. ........................................ 445/26; 445/40; 445/43
[58] Field of Search .................... 316/19, 20, 24, 17, 316/30, 31; 65/108, 110, 279

[56] References Cited

U.S. PATENT DOCUMENTS

| | | |
|---|---|---|
| 2,857,712 | 10/1958 | Yoder et al. |
| 2,965,698 | 12/1960 | Gottschalk ............... 174/50.64 |
| 3,263,852 | 8/1966 | Fridrich ................... 65/59.24 |
| 3,295,016 | 12/1966 | Ayres et al. .............. 316/17 |
| 3,305,289 | 2/1967 | Fridrich ................... 316/21 |
| 3,572,877 | 3/1971 | Ogawa et al. ............ 316/30 |
| 3,685,880 | 8/1972 | Sobieski .................. 316/19 |
| 3,897,233 | 7/1975 | Szilagyi ................... 65/110 X |

Primary Examiner—Kenneth J. Ramsey

Attorney, Agent, or Firm—John P. McMahon; Philip L. Schlamp; Fred Jacob

[57] ABSTRACT

A metal halide discharge lamp is manufactured on a horizontal glass blowing lathe which is indexed by a turntable through angularly spaced work stations. Initially, a length of quartz tubing is formed into a lamp body having an enlarged bulbous midportion defining an arc chamber with tubular necks projecting in opposite directions. Thereafter, a cathode is inserted into one neck, metal halide pellets and a globule of mercury are inserted into the arc chamber, an anode is inserted into the other neck, and hermetic seals are made between the necks and the electrodes. All of the insertions are carried out by moving the various components through the tailstock of the lathe and into the lamp body through one of the necks, the cathode being moved tip-last through the one neck, across the arc chamber and into the other neck. A rotary seal attached to the headstock allows an inert dry gas to be flushed through the lamp body during the assembly steps for the purpose of drying the quartz and the electrodes and to prevent the halide pellets from being exposed to water vapor. Precision in determining the interelectrode gap is achieved by maintaining the initial seizure of the quartz tubing in the headstock of the lathe and referencing bulb formation and electrode insertion to the circular path described by the headstock.

16 Claims, 23 Drawing Figures

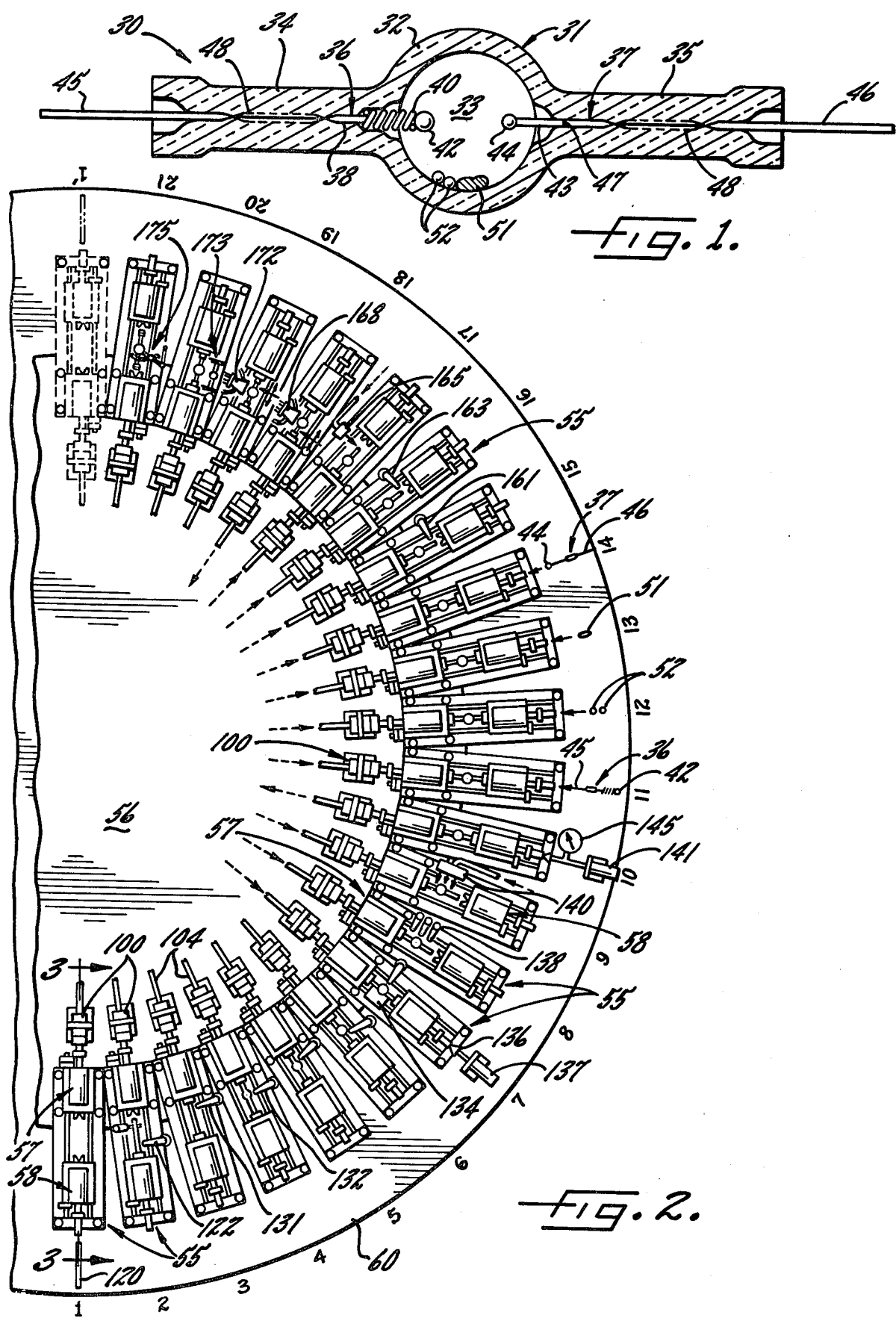

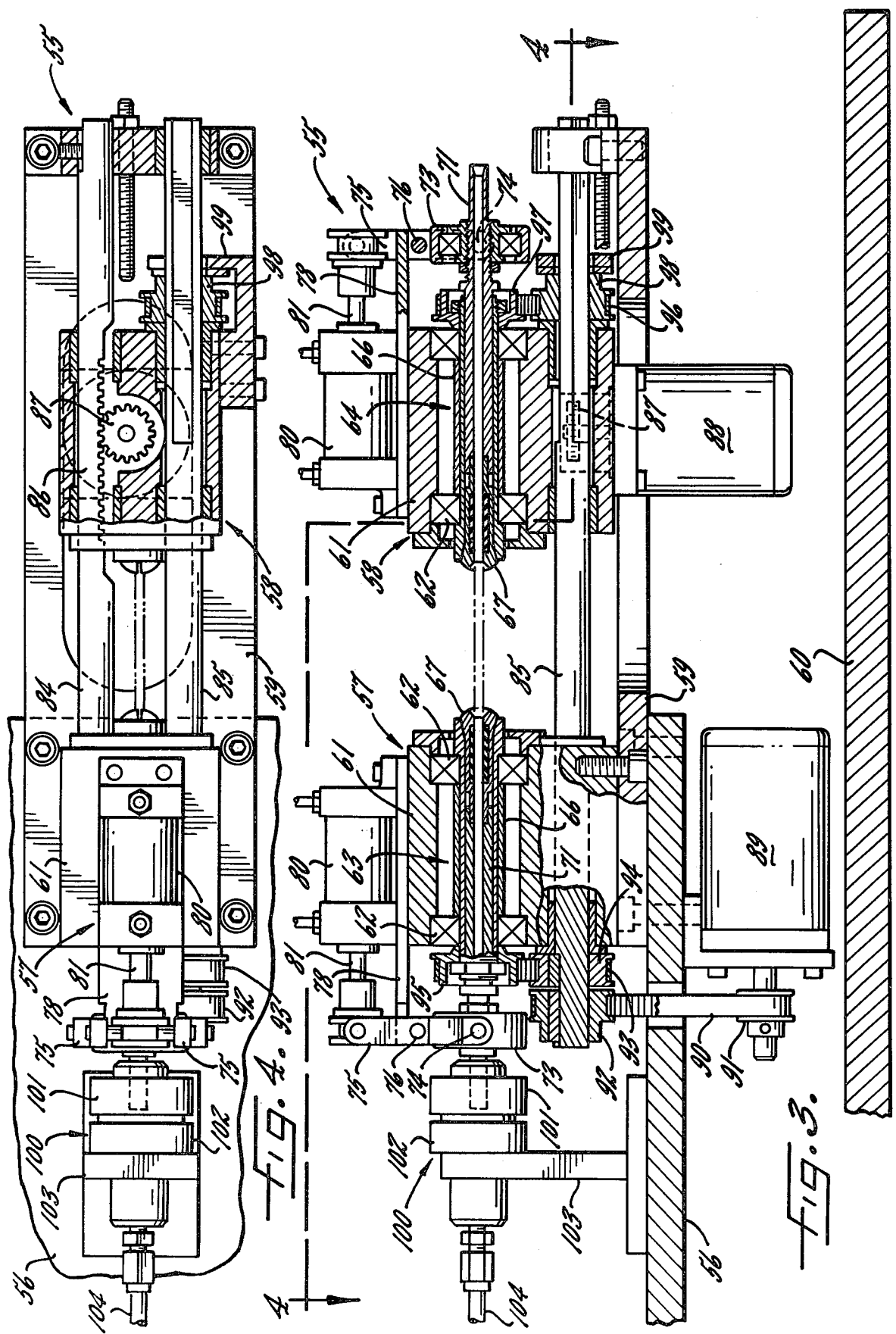

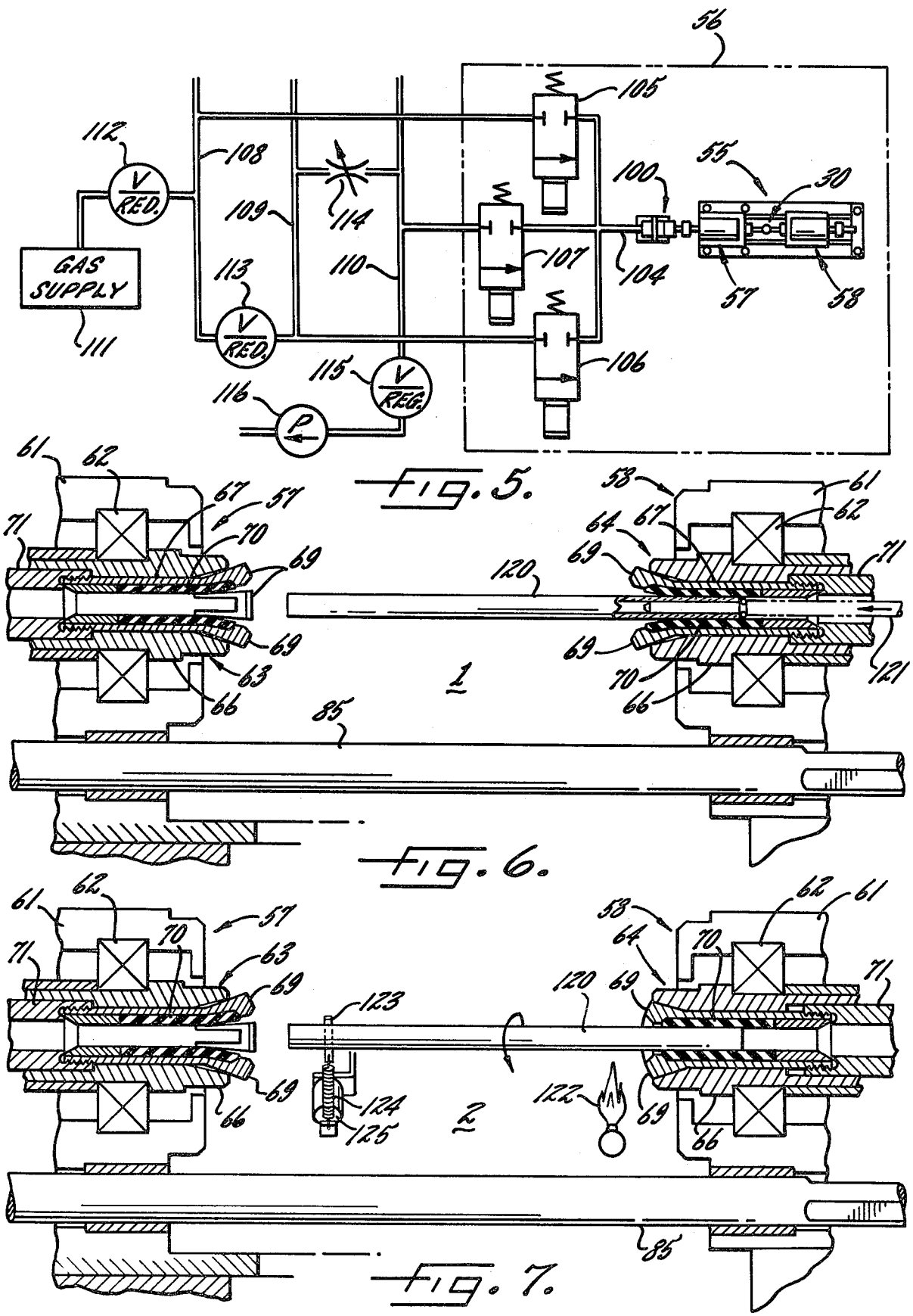

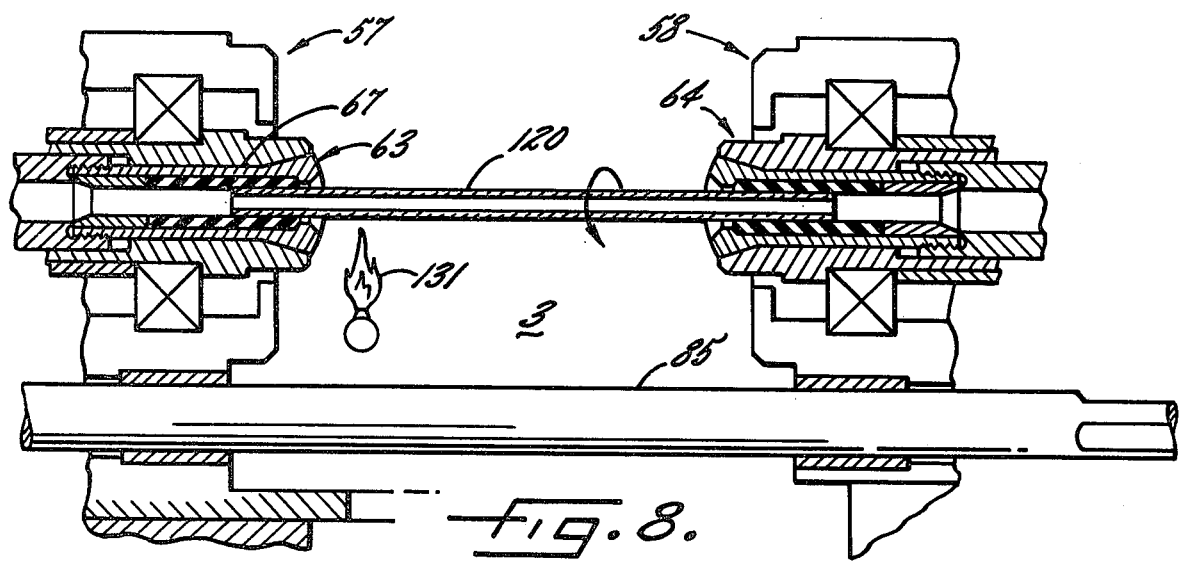
_fig. 8._
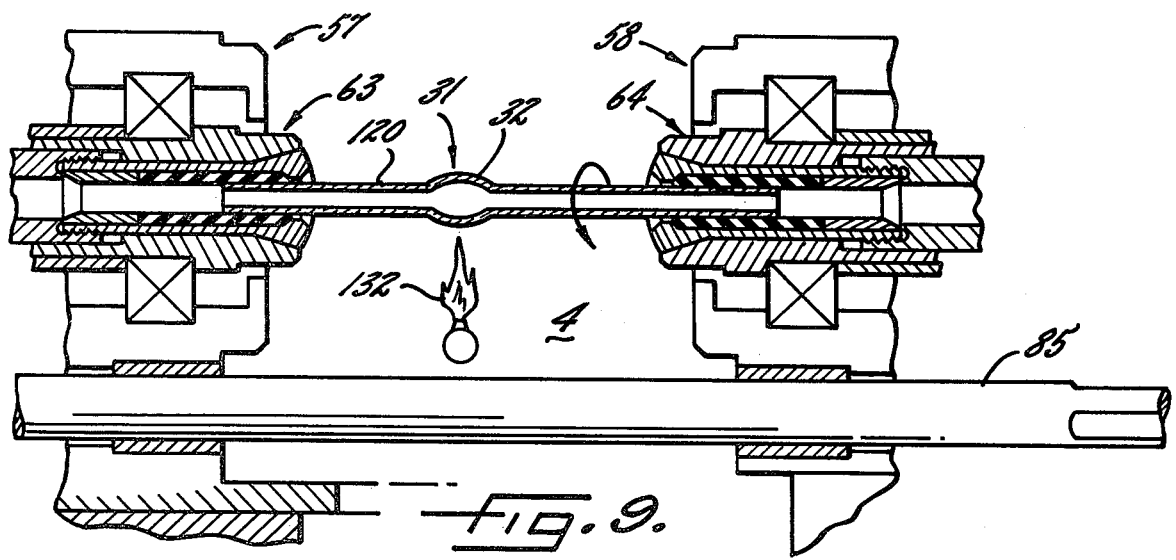
_fig. 9._
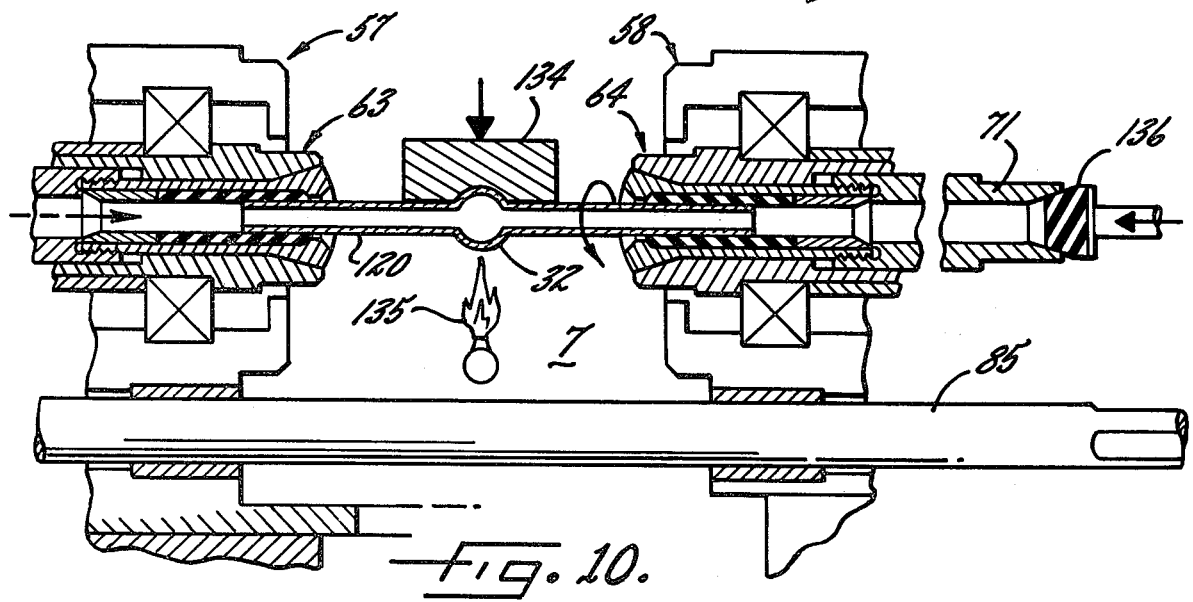
_fig. 10._

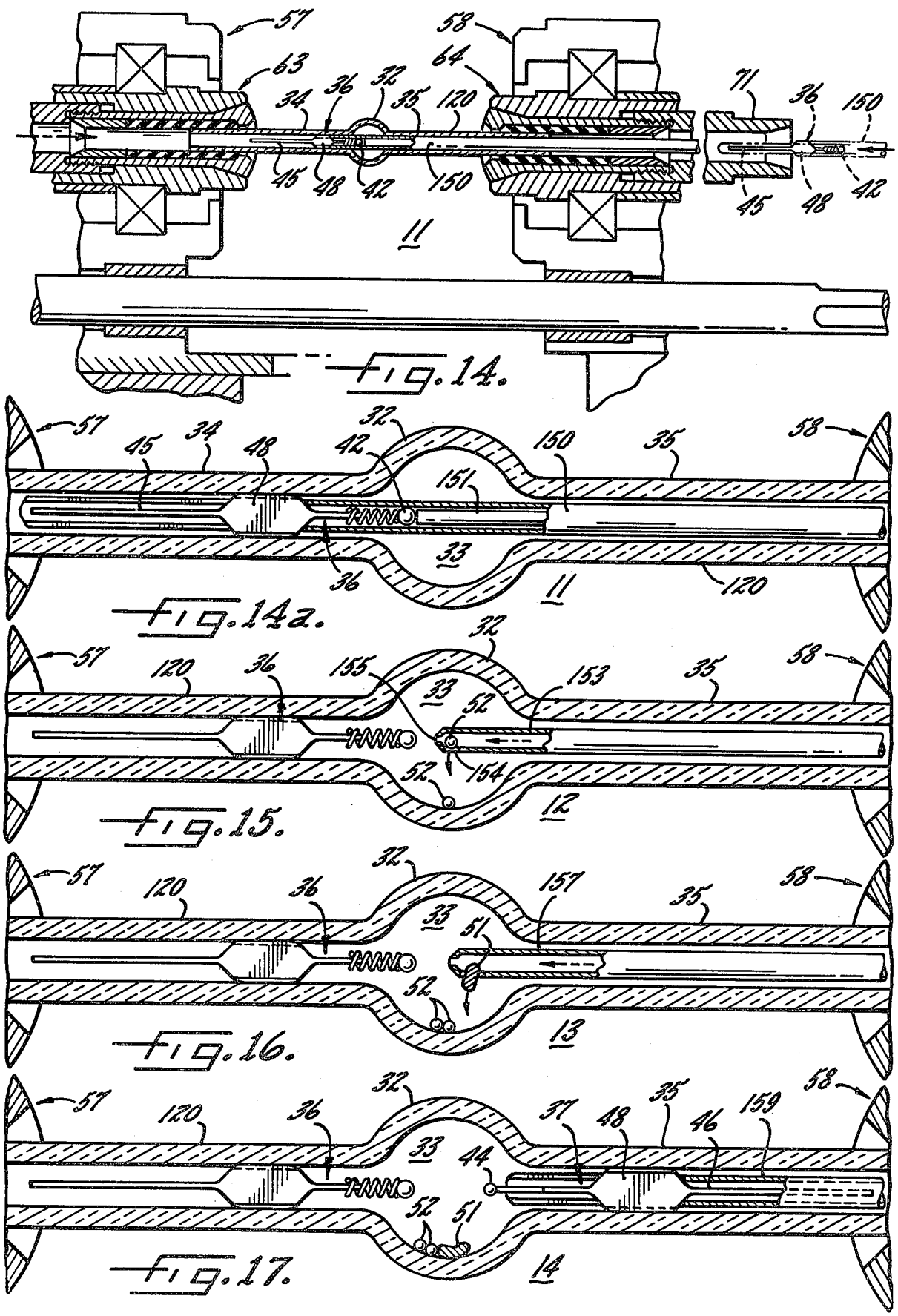

METHOD OF MANUFACTURING A LAMP

This application is a continuation-in-part of our copending application Ser. No. 19,647, filed Mar. 12, 1979, and now abandoned.

BACKGROUND OF THE INVENTION

This invention relates to a method of manufacturing a double-ended lamp; it is particularly suitable for making high pressure metal vapor discharge lamps of the type wherein the lamp body comprises an enlarged bulbous midportion with oppositely extending tubular necks. The bulbous midportion defines an arc chamber which contains an inert starting gas and a fill of vaporizable metal or metals such as mercury or a mixture of mercury and selected metal halides. Electrodes are hermetically sealed within the necks and project into the arc chamber. When an arc is created across the interelectrode gap and the fill is vaporized within the arc chamber, light is produced in known manner.

The invention relates more particularly to the manufacture of a lamp of the type in which the fill and the starting gas are introduced into the arc chamber through one of the necks. This is in contrast to a lamp in which the electrodes are first sealed within the necks and in which the fill and the starting gas are then introduced into the arc chamber through a lateral exhaust tube which is subsequently tipped off. The vestiges of the tip-off form a discontinuity which is more objectionable the smaller the size of the lamp.

In all discharge lamps it is necessary to have a clean arc chamber and to avoid contamination of the fill. Certain types of fills (e.g., those containing metal halides) are very hygroscopic and react when exposed to even minute amounts of water vapor. Metal halides usually are supplied in the form of pellets having a high degree of purity. To preserve this purity and insure the production of an acceptable lamp, it is necessary to protect the halides, the electrodes and the lamp body from water vapor and other contaminants during assembly of the components and until such time as the arc chamber has been safely sealed. In miniature discharge lamps, the deleterious effects of contamination are magnified and the need for prorection is all the greater.

In high pressure metal vapor lamps, the arc voltage drop varies proportionally to the length of the interelectrode gap. The heating of the ends of the arc chamber is strongly influenced by the extent to which the electrodes are inserted and project into the chamber. Such heating determines vaporization of the fill, particularly the metal halides which tend to condense in the cooler ends. Thus both the length and the location of the interelectrode gap are important and the need for precision in its determination increases as the size of the lamp is reduced.

SUMMARY OF THE INVENTION

The general aim of the present invention is to provide a high speed, mass production method for manufacturing lamps of the aforegoing general character. The invention is particularly characterized in one aspect by the unique manner in which the components of the lamp are assembled to protect against degradation of the fill; in a second aspect by the manner in which the arc chamber is formed to achieve high internal purity which is preserved by the unique manner of assembly of components occurring thereafter; and in a third aspect by the precision in determination of the interelectrode gap made possible by seizing a vitreous tube in a glass lathe at the outset and maintaining such single seizure throughout subsequent formation of the lamp body and assembly of components.

One object of the invention is to load the electrodes and the fill into the lamp body by a novel method which enables the lamp body to be flushed continuously with a dry gas for preventing contamination of the components of the lamp during the assembly operations.

Another object is to provide a lamp assembly method which advantageously may be carried out at relatively high speed on a horizontal glass blowing lathe immediately after the lamp body itself has been formed on the lathe, and which takes advantage of the accuracy of assembly and of the cleanliness made possible by a continuous operation starting with quartz tubing and ending in a finished lamp.

ELECTRODE INSERTION SCHEME

In its first aspect, the invention resides in a method in which the fill and the two electrodes are inserted into the lamp body through just one of the necks thereof and preferably while the lamp body is held and hermetically coupled in the chucks of the headstock and the tailstock of a horizontal glass blowing lathe. This allows a purging gas to be flushed through the lamp body by way of the second neck. The first electrode is inserted tip last and the second is inserted tip first, and they are both transported upstream against the gas flow.

PURIFICATION BY CONTINUOUS FLUSH

In its second aspect, the invention provides the additional feature of forming the lamp body from a length of vitreous tubing which has been heated into the softening range, immediately prior to inserting the electrodes into the bulb in the unique manner previously described. While being heated, and also after it is formed into a bulb as by blowing, the tube or lamp body is flushed and such flushing removes moisture and other contaminants from the vitreous material over a higher temperature range than the finished lamp will encounter throughout its life. The flushing is continued of course during the insertion of the electrodes and the fill up to the closing off of the lamp body. This makes possible the high degree of purity needed for a miniature metal halide lamp.

PRECISE DETERMINATION OF GAP

In its third aspect, the invention realizes the high level of accuracy needed in the interelectrode gap determination. This is achieved by seizing a vitreous tube in a glass lathe and thereafter maintaining this single seizure and referencing to it throughout the formation of the bulbous midportion in the tube and the insertion of the electrodes. By accurately positioning, relative to the lathe, first the mold into which the bulb is expanded and then the electrodes which are subsequently inserted into the bulb, precision is achieved in both the length of the gap and its location within the bulb.

PREFERRED SEQUENCE

In a preferred sequence, a glass lathe is used in forming the lamp body and is mounted on a rotary turntable or carrousel for advance through various work stations. A length of quartz tubing is seized in the headstock of the lathe and such seizure is thereafter maintained while the tube is rotated and its midportion is heated into the softening range. Meanwhile the tube is flushed with inert dry gas to drive out moisture and contaminants from the quartz. The tube is then temporarily pressurized and expanded into a mold which is precisely located relative to the circle described by the headstock of the lathe. This provides a lamp body having a bulbous midportion with oppositely projecting neck portions one of which is seized in the headstock. Flushing is resumed and one electrode-inlead assembly is inserted reversely or tip-last through the downstream neck and transported upstream through the arc chamber into the upstream neck. The fill is then loaded through the downstream neck and deposited in the arc chamber. Thereafter the other electrode-inlead assembly is inserted tip first through the downstream neck and transported up to the arc chamber. Flushing is terminated when the downstream neck portion is closed off and thereafter the electrodes are heat-sealed into their respective neck portions. This sequence utilizes all three aspects of the invention and obtains all the important advantages, namely a bulb of high internal purity, lamp components and fill that were at all times protected against contamination or degradation, and precision in arc gap determination, all in a high speed mass production process.

BRIEF DESCRIPTION OF THE DRAWINGS

FIG. 1 is a cross-sectional view, on a greatly enlarged scale, taken longitudinally through a typical lamp adapted to be manufactured by the new and improved method of the present invention.

FIG. 2 is a fragmentary top plan view of exemplary apparatus for carrying out the method.

FIG. 3 is an enlarged fragmentary cross-section taken substantially along the line 3—3 of FIG. 2 and shows one of the glass blowing lathes.

FIG. 4 is a fragmentary cross-section taken substantially along the line 4—4 of FIG. 3.

FIG. 5 is a diagram schematically showing the control circuit for the flushing gas.

FIG. 6 is a fragmentary view of the headstock and tailstock of the lathe illustrated in FIGS. 3 and 4 and shows the first step of the method.

FIGS. 7 to 14 are views similar to FIG. 6 and show additional steps of the method.

FIG. 14a is an enlarged view which shows, on an enlarged scale, the step illustrated in FIG. 14.

FIGS. 15 to 17 are views similar to FIG. 14a and show the next three steps of the method.

DETAILED DESCRIPTION

Lamp Structure

Figure 11:
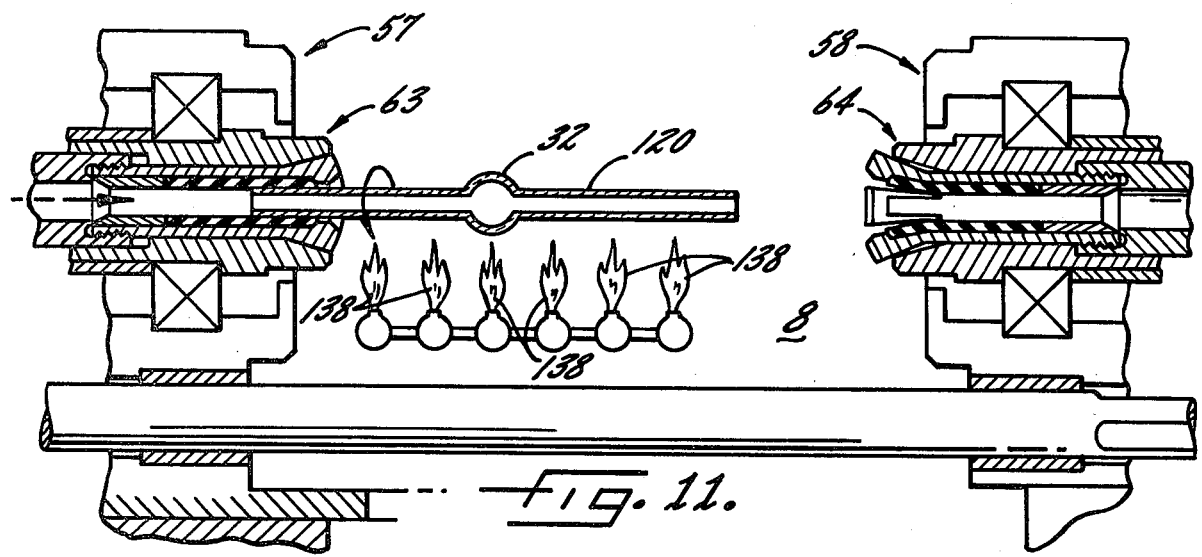

A typical lamp 30 which is adapted to be manufactured by the process of the present invention is shown in FIG. 1 and is similar to one of the lamps disclosed in Cap et al U.S. application Ser. No. 912,628, filed June 5, 1978, and entitled High Pressure Metal Vapor Discharge Lamps of Improved Efficacy, that application being assigned to the same assignee as the present invention. Briefly, such a lamp comprises an arc tube or lamp body 31 made from a piece of fused silica or quartz tubing and having a hollow bulbous midportion 32 which defines an arc chamber 33 for containing a high pressure discharge. In this particular instance, the arc chamber is generally spherical and has a volume of less than one cubic centimeter. The arc chamber may, however, be of various shapes (e.g., ellipsoidal or cylindrical) and may be considerably larger than that of the lamp 30.

Joined to and extending in diametrically opposite directions from the midportion 32 of the lamp body 31 are two reduced diameter tubular neck portions 34 and 35. Each neck is generally cylindrical and is of small cross-sectional area when compared with the cross-sectional area of the midportion.

Electrode-inlead assemblies 36 and 37 are inserted into the necks 34 and 35, respectively. The electrode 36 forms the cathode of the lamp 30 and comprises a length of molybdenum wire 38 which projects a predetermined distance out of the neck 34 and into the arc chamber 33. A coil 40 of tungsten wire is wound around the inner end portion of the molybdenum wire and terminates in a sphere which defines the tip 42 of the electrode 36. Reference may be made to copending U.S. application Ser. No. 973,182, filed Dec. 26, 1978 by Dvorak and Fridrich, Electrode for High Pressure Metal Vapor Lamp, assigned like this application, for a more complete description of the subject electrode.

The electrode 37 constitutes the anode of the lamp 30 and is formed by a length of tungsten wire 43 received within the neck 35 and projecting a predetermined distance into the arc chamber 33. A small sphere is formed on the distal end of the wire 43 and defines the tip 44 of the electrode 37. The space between the tips 42 and 44 of the electrodes 36 and 37 defines the arc gap.

Molybdenum inlead wires 45 and 46 extend into the outer ends of the necks 34 and 35, respectively, and are adapted for connection to the electrical terminals of an outer envelope (not shown). The inlead 45 is formed integrally with the molybdenum wire 38 of the electrode 36 while the inlead 46 is suitably joined at 47 to the tungsten wire 43 of the electrode 37. The join at 47 is conveniently made by a laser butt weld per U.S. Pat. No. 4,136,298—Hansler. Each inlead includes a relatively flat foliated portion 48 intermediate its ends which may be formed by cross-rolling or by longitudinal rolling. Alternatively a composite inlead comprising a length of foil with a wire welded to each end may be used. The foil portion enables a hermetic seal to be established between the electrode and the neck so as to hold the electrode in place and to seal the arc chamber 33 from the outside atmosphere. The seals through necks 34 and 35 are formed by heating and fusing the quartz to collapse the internal passage through each neck and cause the quartz to wet and seal to the foil portion of the associated inlead.

A fill or dose of vaporizable metal is contained within the arc chamber 33 and is adapted to vaporize and produce light in a well-known manner when an appropriate voltage is applied across the electrodes 36 and 37 to create an arc between the tips 42 and 44 thereof. Herein, the fill comprises mercury and a mixture of selected metal halides (e.g., NaI, ScI$_3$ and ThI$_4$) although the fill could consist of mercury alone. After the lamp 30 has been manufactured but before the lamp is first operated, the mercury exists in the arc chamber 33 in the form of a globule 51 while the halides exist in the form of one or more pellets 52.

The lamp 30 is completed by a quantity of inert starting gas which initially exists in the arc chamber 33 at a subatmospheric pressure of about 120 torr absolute. Argon is used as the starting gas in the present lamp. Unlike many discharge lamps, the present lamp does not include a tipped-off lateral exhaust tube extending from the bulbous midportion 32.

In manufacturing a lamp 30 of the above type, one of the difficult problems which is encountered involves loading the halide dose into the arc chamber 33 without contaminating the dose with water vapor or other impurities during insertion of the dose and while sealing the chamber. The halide pellets 52 are extremely hygroscopic and mere momentary exposure to the ambient atmosphere may allow enough moisture to be picked up that lamp operation will be deleteriously affected. As initially processed, the total oxygen content of the pellets is less than fifty parts per million. In order for the lamp 30 to operate effectively and reliably, it is necessary to preserve the high purity of the pellets by shielding them at all times from the atmosphere and its inevitable water vapor until they are safely sealed in the arc chamber.

The present invention contemplates the provision of a high speed, mass production lamp manufacturing process which enables the interior of the lamp body 31 to be effectively purged to water vapor and kept free of such vapor from prior to the time the halide pellets 52 are inserted into the arc chamber 33 until the time the arc chamber has been completely sealed and the pellets are protected by the starting gas therein. The invention is particularly characterized by the fact that purging of the lamp body 31 is effected by continuously flushing the body during a certain interval of the manufacturing process with a dry non-reactive gas which is introduced into the body through one of the necks 34, 35 (e.g., the neck 34). By a non-reactive gas is meant a gas that does not react deleteriously with any of the lamp or equipment parts at the temperature involved. It is most convenient to use argon because it serves also as the inert starting gas which is finally sealed into the arc chamber. But dry nitrogen could be used as an economy measure during the bulb forming steps, and argon substituted therefor prior to sealing in the electrode-inlead assemblies. To enable the flushing gas to be introduced continuously through the neck 34, the pellets 52, the mercury globule 51 and both of the electrodes 36 and 37 are inserted into the lamp body 31 from the outer end of the other neck 35 with the electrode 36 passing tip-last through that neck, across the arc chamber 33 and into the neck 34 (see FIGS. 14 to 17).

Glass Lathe Construction

In the present instance, a horizontal glass blowing lathe 55 (FIGS. 3 and 4) is used in manufacturing the lamp 30. To enable high speed production of the lamps, several identical lathes 55 preferably are carried on and are spaced angularly around a rotary turntable or carrousel 56 (FIG. 2) adapted to be indexed intermittently and counterclockwise about a vertical axis so as to move each lathe through a series of stations where successive operations are performed to manufacture the lamp. Each lathe herein is indexed to and dwells momentarily at twenty-one stations while a lamp is being manufactured, the lathe being moved through such stations as the table 56 rotates through one-half revolution. To enable effective use of the stations, twenty-one lathes are spaced angularly around one-half of the table and thus one lathe dwells at each station each time the table is stopped. An additional twenty-one lathes (not shown) are spaced around the other half of the table and move through twenty-one stations which are identical to the corresponding stations around the first half of the table. Thus, one lamp is made when any given lathe is moved through one-half revolution by the table and then a second lamp is made on that same lathe when the latter is moved through an additional one-half revolution. It should be appreciated, however, that the lathes and the stations may be arranged around the table in any desired manner.

To help gain a quick understanding of the manufacturing method of the present invention, the construction of the lathes 55 will be described briefly before the method itself is described. Each lathe comprises a headstock 57 and a tailstock 58 adapted to move toward and away from the headstock. The lathes are mounted in radial attitudes with the headstock located inboard near the outer peripheral portion of the turntable 56 above the upper side thereof and secured to horizontal mounting plate 59 (FIGS. 3 and 4) fastened to the table. The mounting plate projects outwardly from the table and also serves to support the tailstock located outboard relative to the headstock. As shown in FIGS. 2 and 3, the mounting plate and the tailstock overhang a circular base or work bench 60 which underlies and projects outwardly from the turntable 56. The work bench is stationary and supports various apparatus (to be described subsequently) used in making the lamp 30.

In many respects, the headstock 57 and the tailstock 58 of each lathe 55 are identical. Thus, both the headstock and the tailstock include a housing 61 (FIG. 3) having bearings 62 which support a rotatable chuck, the chucks of the headstock and the tailstock being indicated generally by the reference numerals 63 and 64, respectively. Each chuck comprises an outer sleeve 66 journaled by the bearings 62 and receiving a collet 67 (see FIG. 6) having one end portion formed by a series of angularly spaced spring fingers 69. A sleeve 70 of silicone rubber is telescoped into the collet and is adapted to engage and couple hermetically with the quartz tubing to be received in the collet.

A key (not shown) couples each collet 67 for rotation with its respective sleeve 66 while allowing the collet to move axially within the sleeve. When the collet is retracted inwardly into the sleeve, the fingers 69 of the collet are cammed radially inwardly by the end portion of the sleeve 66 to effect closing of the collet (see FIG. 7). Axial shifting of the collet in the opposite direction enables the fingers to spring outwardly so as to open the collet.

To shift each collet 67 inwardly and outwardly, a tubular drawbar 71 (FIG. 3) is connected to the collet and is slidably received within the sleeve 66. One end portion of the drawbar is journaled by the inner race of a bearing assembly 73 whose outer race is pivotally connected at 74 to the lower end portions of a pair of upright arms 75 disposed on opposite sides of the bearing assembly. A pin 76 extends through the arms 75 between the ends thereof and connects the arms pivotally to a plate 78 attached to the upper side of the housing 61. Supported on the plate is a pneumatically operated actuator 80 having a reciprocable rod 81 which is connected pivotally to the upper end portions of the arms 75. When the rod 81 is extended from the position shown in FIG. 3, the arms 75 pivot about the pin 76 and act through the drawbar 71 to push the collet 67 outwardly from its sleeve 66 to enable the collet to open. The collet is closed when the rod 81 of the actuator 80 is retracted and pivots the arms 75 in a direction to cause the drawbar 71 to pull the collet into the sleeve 66.

The headstock 57 of each lathe 55 is fixed on the mounting plate 59 but the tailstock 58 is arranged to move toward and away from the headstock. For this purpose, the housing 61 of the tailstock is slidably supported on a pair of horizontal guide shafts 84 and 85 (FIG. 4) mounted on the upper side of the plate 59. The guide shaft 84 is formed with a toothed section 86 (FIG. 4) defining a rack which meshes with a pinion 87. The latter is adapted to be rotated by the shaft of a reversible stepping motor 88 attached to the lower side of the housing 61 of the tailstock 58. When the motor is energized, the pinion travels along the rack and advances the tailstock toward or retracts it away from the headstock.

The chucks 63 and 64 of each lathe 55 are adapted to be rotated by an electric motor 89 (FIG. 3) secured to the underside of the table 56 and located beneath the headstock 57. A timing belt 90 is trained around a first pulley 91 on the drive shaft of the motor and a second pulley 92 which is keyed to the guide shaft 85. The latter is rotatably supported on the mounting plate 59 and within the lower portions of the housing 61 and thus serves as a jackshaft as well as a guide shaft.

Another timing belt 93 (FIG. 3) is trained around pulleys 94 and 95 secured to the shaft 85 and to the sleeve 66 of the chuck 63 of the headstock 57. Accordingly, the sleeve 66 and the collet 67 of the chuck 63 are rotated whenever the motor 89 is energized. To rotate the chuck 64 of the tailstock 58, a third timing belt 96 is trained around pulleys 97 and 98. The pulley 97 is secured to the sleeve 66 of the chuck 63 while the pulley 98 is slidably supported on a non-circular portion of the shaft 85. When the tailstock 58 is advanced toward the headstock 57, a bracket 99 (FIG. 4) secured to the housing 61 of the tailstock pushes the pulley 98 along the shaft 85 in order to keep that pulley properly aligned with the pulley 97. The housing 61 of the tailstock pushes the pulley 98 in the opposite direction along the shaft 85 when the tailstock is retracted away from the headstock.

Each lathe 55 is completed by a rotary seal 100 (FIGS. 3 to 5) which is located at the inboard end of the headstock 57 to enable gas to be introduced into and flow through the chuck 63 of the headstock while rotating. The rotary seal herein comprises a rotating portion 101 which is fast to and turns with drawbar 71 of chuck 63, and a fixed portion 102 supported by bracket 103 on turntable 56. The two portions are coupled in such manner as to establish a gas-tight seal between them while allowing rotation of the rotatable portion. Since there are rotary seals commercially available whose construction and mode of operation are known, no details need be given here.

The stationary portion 102 of the rotary seal 100 of each lathe 55 communicates via a line 104 (FIG. 5) with a bank of three solenoid-actuated, two-position valves 105, 106 and 107 which are connected in parallel with one another. The valves 105, 106 and 107 associated with each lathe communicate with three manifolds 108, 109 and 110, respectively, which serve all of the lathes on the table 56. An inert gas such as argon from a pressurized source 111 is supplied to the manifold 108 via a pressure reducing valve 112 which establishes a comparatively high pressure of about 8.0 psig in the manifold 108. Communication between the manifolds 108 and 109 is established by way of a second pressure reducing valve 113 which maintains the argon in the manifold 109 at a relatively low pressure such as 0.1 psig.

The third manifold 110 communicates with the manifold 109 via an adjustable metering valve 114 and also communicates with an adjustable pressure regulating valve 115 and a vacuum pump 116. The metering valve 114 and the pressure regulating valve 115 are adjusted so as to maintain the argon in the manifold 110 at a pressure of about 120 torr absolute. Valve 106 is actuated to allow argon gas at the low 0.1 psig pressure to flow into the headstock collet sleeve 70 at all inactive stations in order to prevent contamination by atmospheric moisture.

Lamp Manufacturing Method

Now that the construction of the latches 55 has been explained, the lamp manufacturing method can be described in detail. To facilitate such description, the twenty-one stations at which each lathe dwells have been numbered from 1 to 21, respectively, around the stationary base or work bench 60 shown in FIG. 2 with station No. 1 being illustrated as being located at a six o'clock position and with station No. 21 being located just short of a twelve o'clock position. Various automated mechanisms for performing the lamp manufacturing operations are located in the different stations and are positioned on the work bench. These mechanisms per se do not, however, form any part of the present invention and thus they have been shown and will be described only in such detail as is necessary to gain an understanding of the manufacturing method.

The lamp body 31 is made from an elongated piece 120 (FIG. 6) of quartz tubing which is initially cylindrical. At station No. 1, a piece of tubing having a length somewhat greater than the length of the finished lamp 30 is loaded into the lathe 55 in station No. 1 while the tailstock 58 of that lathe is fully retracted from the headstock 57 as shown in FIG. 6. Loading of the tube 120 may be effected by using a reciprocable pusher 121 to move the tube endwise through the drawbar 71 of the tailstock and into the collet 67 thereof from the outboard end of the drawbar while the collet is open (see FIGS. 2 and 6). A stack of tubes may be contained in a magazine (not shown) in station No. 1 and may be released one-by-one to the pusher by a suitable escapement (not shown).

After the tube 120 has been located in the collet 67 of the tailstock in the position shown in FIG. 6, the collet is closed by the actuator 80 on the tailstock 58 so as to cause the rubber sleeve 70 to grip the outboard end portion of the tube. After the pusher 121 has been retracted out of the drawbar 71 of the tailstock, the table 56 is indexed to advance the lathe 55 to station No. 2.

At station No. 2 (FIG. 7), motor 89 is energized to rotate chuck 64 and quartz tube 120 held by it, and a flame 122 is played against the tube next to the chuck. At the same time a flexible finger 123, suitably in the form of a wand extending from a length of coiled spring 124, is swung into place by a pneumatic actuator 125 (FIG. 7) so as to touch lightly the unsupported end of tube 120. The flame playing on the supported end of the tube is just sufficient to soften the quartz, and the light pressure of the finger on the unsupported end causes the tube to straighten out and corrects any eccentric or whipping movement of the unsupported end.

Next, lathe 55 is indexed to and dwells in station No. 3 (FIG. 8), and stepping motor 88 is energized to move tailstock 58 toward headstock 57 and cause the inboard end of the quartz tube to enter collet 67 of the headstock. That collet then is closed by the actuator 80 of the headstock and thus the tube becomes gripped by both the headstock and the tailstock. As soon as the collet is closed, the argon from manifold 109 flows through the quartz tube. Meanwhile motor 89 is energized to rotate both chucks 63 and 64, and while the quartz tube 120 is rotating, a flame 131 (FIG. 8) is played against it close to headstock 57. The heat-softening serves to relieve any stress which might have been induced in the tube as a result of being gripped by both chucks 63 and 64, and also serves to straighten the headstock end of the tube. The seizure of tube 120 in collet 67 of headstock 57 will now be maintained until the bulbous midportion 32 has been formed in the tube and the electrodes have been positioned in it. Since the headstock is fixed on the carrousel, it describes a circular arc in advancing from station to station.

At station No. 4 (FIG. 9), a flame 132 is directed against the center of the quartz tube as it rotates while held in both chucks 63 and 64 (see FIG. 9). At the same time, the tailstock 58 is advanced a short distance toward the headstock 57 to gather the quartz or, in other words, to force the softened quartz at the center of the tube to bulge outwardly and begin formation of the bulbous midportion 32 of the lamp body 31.

Gathering operations identical to those performed at station No. 4 are carried out at each of stations Nos. 5 and 6 (not shown in detail). In each of the latter stations, the tailstock 58 is advanced inwardly an additional short distance toward the headstock 57 to effect further gathering of the quartz tube 120 and to cause the bulbous midportion 32 of the lamp body 31 to enlarge gradually.

The bulbous midportion 32 is blown into its final shape when the lathe 55 dwells in station No. 7 (FIG. 10). For this purpose, a mold 134 on the work bench 60 is advanced automatically into proximity with the partially formed bulbous midportion 32. The mold is accurately located relative to the circular arc described by the headstock to assure that the final configuration into which the midportion 32 is blown be located at a precise distance from the headstock in which quartz tube 120 is seized. A flame 135 for heating the bulbous midportion is located generally opposite the mold which is formed with a cavity whose shape is complementary to the desired final shape of the bulbous midportion.

While the mold 134 is being moved into place in station No. 7, a closure in the form of a plug 136 (FIG. 10) is shifted into the outboard end of the drawbar 71 of the chuck 64 of the tailstock 58. The plug is supported and advanced by a suitable mechanism 137 (FIG. 2) on the work bench 60 and serves to seal off the chuck 64 and the tailstock end of the tube 120 so that the tube may be pressurized with gas for the purpose of expanding the bulbous midportion 32 into the cavity of the mold. Pressurization of the tube 120 is effected by automatically opening the valve 105 (FIG. 5) to cause argon at relatively high pressure (i.e., 8 psig) to flow from the manifold 108, through the rotary seal 100 and the chuck 63 of the headstock 57, and into the tube. The gas is introduced into the tube as it rotates while held by the chucks 63 and 64 and while the flame 135 is being directed against the bulbous midportion 32 to soften the quartz. Accordingly, the quartz is blown into and is shaped by the mold 134 so as to form the bulbous midportion 32 into its final configuration shown in FIG. 1. The mold 134 and the plug 136 then are retracted to permit the lathe 55 to advance to station No. 8.

At station No. 8 (see FIG. 11), the tube 120 is heated along substantially its entire length while simultaneously being flushed with argon admitted into the chuck 63 and the tube through the valve 105. The prior heating of the midportion during the quartz gathering and bulb blowing together with the present heating and flushing operation clean the tube of any contaminants over a higher temperature range than the finished lamp will encounter during its life. In particular, moisture is driven from the tube so that the tube will be truly dry when the halide pellets 52 are subsequently introduced into it. As shown in FIG. 11, heating of the tube 120 is effected by a series of flames 138 spaced along the length of the tube. As an alternative, however, a single flame could be traversed along the tube to heat the tube along substantially its entire length. As the tube 120 is heated at station No. 8, it is rotated by the chuck 63 of the headstock 57. Also, the tailstock 58 may be opened to release the tube (see FIG. 11) and shifted to its retracted position during the heating and flushing operation so that moisture within the tube will escape to atmosphere rather than being driven into the chuck 64 of the tailstock. Retraction of the tailstock also prevents excessive heating of the tailstock. However the tube is not released from the headstock so that the precise positioning of the bulb is maintained.

Figure 12:
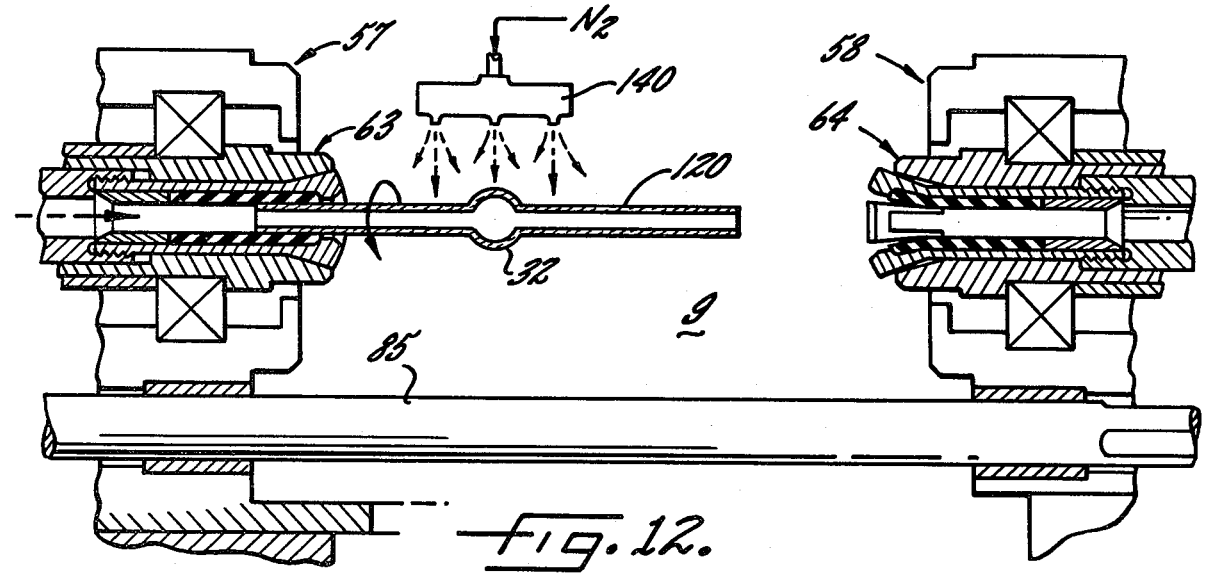

Upon being advanced to station No. 9 (FIG. 12), the tube 120 is cooled to permit subsequent re-gripping of the tube by the tailstock 58. Herein, cooling of the tube is effected by directing jets of cooled nitrogen from a manifold 140 against the tube while the latter is being rotated by the headstock 57, while the tailstock is retracted, and while argon is being introduced into the tube through the headstock.

Figure 13:
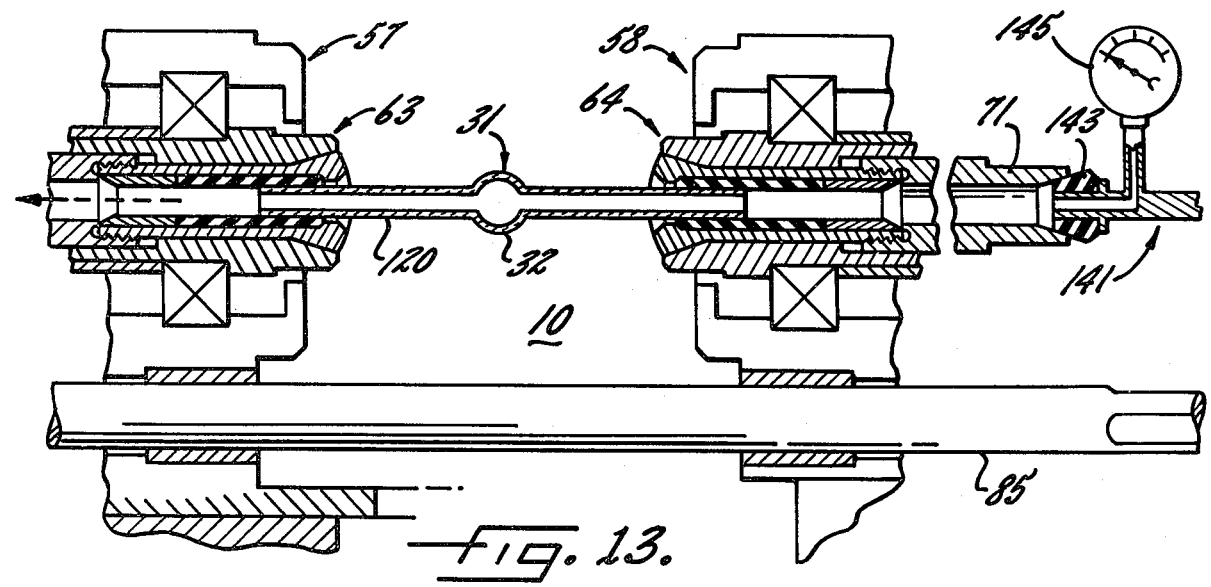

At station No. 10, the tailstock 58 advances forwardly and re-grips the tube 120 as shown in FIG. 13. Thereafter, a mechanism 141 on the work bench 60 moves inwardly toward the outboard end of the tailstock to enable a leak test to be performed. As schematically shown, the mechanism comprises an apertured plug 143 adapted to telescope into the outboard end of the drawbar 71 of the tailstock, there being a vacuum gauge 145 communicating with the aperture in the plug. Once the plug 143 has been advanced to the position shown in FIG. 13, the valve 107 (FIG. 5) is opened to cause the vacuum pump 116 to draw a vacuum in the tube 120 via the manifold 110, the rotary seal 104 and the headstock 57. If the bulbous midportion 32 of the lamp body 31 has been properly formed and is gas-tight, a high order of vacuum will be established in the tube 120 and the reading of the vacuum gauge 145 will be below a predetermined value. If on the other hand there is a leak in any part of the tube 120, the reading of the gauge indicates a defective tube. The gauge may also produce a signal which is used to effect cancellation of the operations that otherwise would be performed on the tube after station No. 10.

After the leak test has been completed, the mechanism 141 is retracted away from the drawbar 71 of the of the tailstock 58 to enable the lathe 55 to advance to station No. 11 where the cathode-inlead assembly 36 is inserted into the tube 120 (see FIGS. 14 and 14a). Before the mechanism 141 is retracted, the valve 107 is closed to cut off the vacuum and the valve 105 is opened to initiate a flow of argon from the manifold 108 through the headstock 57 and into the tube 120. The flow of argon into the tube is maintained continuously until the tube is sealed and serves to keep it purged of moisture.

Importantly and in keeping with the invention, the cathode assembly 36 is inserted into the quartz tube 120 at station No. 11 by being moved tip-last through the chuck 64 of the tailstock 58, through that portion of the tube that ultimately defines the neck 35 of the lamp 30, across the arc chamber 33, and finally into that portion of the tube that ultimately defines the neck 34 of the lamp. Thus, the cathode assembly 36 is not loaded tip-first through the headstock 57 and directly into the neck 34 but instead is loaded tip-last into the neck 34 after first passing through the tailstock 58 and the neck 35. As a result of the cathode being loaded in this way, the rotary seal 100 can be located at and can remain attached permanently to the inboard or upstream end of the headstock 57 to enable the tube 120 to be flushed continuously with a dry non-reactive gas such as argon until such time as the tube is sealed.

More specifically, the cathode assembly 36 is preloaded into a sleeve-type holder 150 (FIG. 14a) which is automatically brought into alignment with the outboard end of the drawbar 71 of the tailstock 58 when the lathe 55 dwells at station No. 11 (see the position of the cathode shown in phantom lines in FIG. 14). The holder 150 is oriented such that the tip 42 of the cathode is disposed in trailing relationship to the inlead 45 thereof.

After the lathe 55 stops at station No. 11, a pusher (not shown) shoves the holder 150 and the preloaded cathode assembly 36 through the chuck 64 of the tailstock 58, through the neck 35 and into the neck 34 (see FIG. 14a). If the tip of the cathode be considered the head of the cathode-assembly, the assembly may be said to be shoved feet first through the lamp body. The stroke of the pusher is controlled so as to locate the tip 42 of the cathode at a predetermined distance from the headstock chuck. Because the lamp body has never been released from the headstock chuck since the formation of the bulb, the tip of the cathode is thereby automatically accurately located in the lamp body. Once the cathode assembly has been properly located, the pusher is retracted and withdraws the holder 150 from the cathode and out through the tailstock. During retraction of the holder, a plunger 151 engages the tip 42 of the cathode to prevent the latter from moving with the holder. After removal of the holder, the cathode assembly is prevented from sliding and held in a centered position in the neck 34 by virtue of the frictional engagement of the inside diameter of the neck by foil portion 48 of the inlead.

As pointed out above, argon flows continuously through quartz tube 120 during loading of the cathode assembly. Accordingly, the argon serves to dry any moisture which might be present on the assembly or the holder 150 and thus maintains the tube in a "clean" condition. The flow of argon is continued during indexing of the lathe 55 to station No. 12.

At station No. 12, the halide pellets 52 are loaded into the arc chamber 33 (see FIG. 15). This is achieved by inserting a tubular needle 153 through the tailstock 58 and the neck 35 and by stopping the needle when its tip is near the center of the arc chamber. A downwardly opening port 154 is formed in the needle near the tip thereof while a smaller port 155 opens out of the tip. The needle communicates with a low pressure source (not shown) of dry inert gas located on the work bench 60 at station No. 12.

A stream of the dry inert gas is flushed at all times through needle 153. After the needle has been positioned in the arc chamber 33, an appropriate number of halide pellets 52 are metered from a storage container (not shown) and are released into the stream of gas. The stream carries the pellets through the needle until they reach the downwardly opening port 154 and fall into the arc chamber 33. Because the pellets are discharged from the needle along a path extending transversely to the stream of purging gas flowing into quartz tube 120 through the headstock 57, there is little danger of the pellets becoming entrained in that stream and being blown into or through the neck 35.

Following release of the halide pellets 52, the needle 153 is withdrawn from the tailstock 58 and then the lathe 55 is indexed to station No. 13 where a globule 51 of mercury is injected into the arc chamber 33 (see FIG. 16). Injection of the mercury is effected in substantially the same way as injection of the halide pellets 52 and is carried out with a needle 157 which is virtually indentical to the needle 153. The needle 157 is inserted into the tailstock 58, the mercury globule 51 is released to the gas stream in the needle and then the needle is retracted after the mercury drops into the arc chamber 33. Flushing of quartz tube 120 by gas introduced through the headstock 57 continues during injection of the mercury.

The lathe 55 next is indexed to station No. 14 for insertion of the anode assembly 37 into the tube 120 (see FIG. 17). The assembly is preloaded into a holder 159 similar to the holder 150 and is shoved through the tailstock 58 and into the neck 35 by a pusher. Unlike the cathode 36, the anode 37 is pushed tip or head first into the neck 35. The stroke of the pusher (not shown) is controlled so as to accurately locate the tip 44 of the anode relative to the headstock chuck. Since the lamp body is accurately positioned relative to the headstock chuck and the cathode tip has previously been accurately located, now the length of the gap between cathode and anode tips is precisely determined. Also the gap is accurately positioned at the precise location within the arc chamber 33 called for by the lamp design. Gas continues to flow into quartz tube 120 during insertion of the anode to insure against water vapor reacting with the halide pellets 52.

Figure 18:
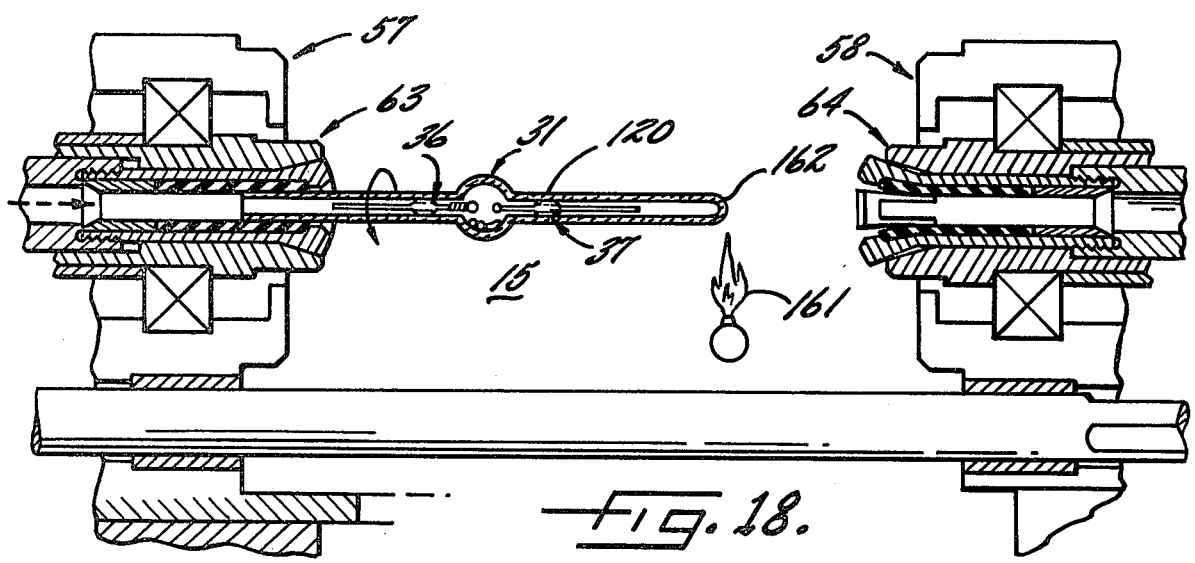
FIGS. 18 to 22 also are views similar to FIG. 6 and show the final steps of the method.

While the lathe 55 dwells at station No. 15, the tailstock 58 is operated to release quartz tube 120 and is retracted (see FIG. 18). A flame 161 then is directed against the unsupported end of the rotating tube. The heat causes the quartz to collapse and dome over as indicated at 162 so as to tip off the tube and form a temporary seal. An operation identical to that performed at station No. 15 is performed by a flame 163 (see FIG. 2) at station No. 16 to insure that tip 162 is truly sealed. During the tipping operations at stations Nos. 15 and 16, argon at low pressure (i.e., 0.1 psig) is admitted into quartz tube 120 through the headstock 57 by way of manifold 109, valve 106 and rotary seal 100. The argon keeps the tube dry but its pressure is of such low magnitude that there is no danger of the gas blowing a hole in the newly formed tip 162.

At station No. 17, a stream of cooled nitrogen is directed at the tip 162 through a nozzle 165 (see FIG. 2) to cool the tip and allow subsequent re-gripping of the quartz tube by tailstock 58. Pressurization of the tube with low pressure argon from the manifold 109 is continued during the cooling step.

Figure 19:
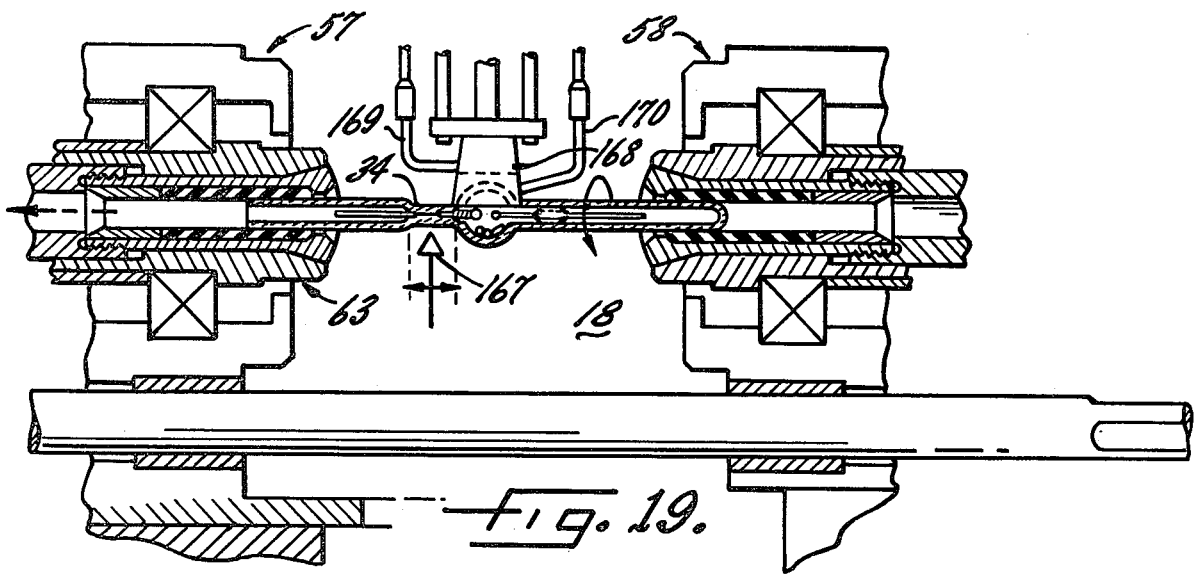

When the lathe 55 reaches station No. 18, the quartz tube 120 is re-gripped by the tailstock 58 and is rotated by both the headstock and the tailstock (see FIG. 19). At this station, the cathode inlead assembly 36 is hermetically sealed into the neck 34 by heating the quartz and causing it to collapse around the foil portion of the inlead. This may be done for example by a laser 167 which traverses along an appropriate length of the neck to cause the quartz to collapse around the cathode. At the same time the bulb portion 32 of the lamp body is cooled by advancing a metal shroud 168 to partially surround it. The shroud contains a sponge which engages the bulb and which is kept wet by water supplied by tube 169 while aspirator tube 170 removes excess water.

Just prior to sealing of the neck 34, the valve 106 is closed and the valve 107 is opened to establish communication between the vacuum pump 116 and the tube 120 by way of the manifold 110 and the rotary seal 100. The vacuum pump draws argon from the manifold 109 into the manifold 110 via the metering valve 114 and reduces the pressure of the argon in the tube 120 to the subatmospheric value of 120 torr absolute. Accordingly, the desired pressure for the starting gas of the lamp 30 is established as an incident to sealing of the neck 34, and the sub-atmospheric pressure assures the desired collapse of the quartz around the foil portion of the inlead.

Figure 20:
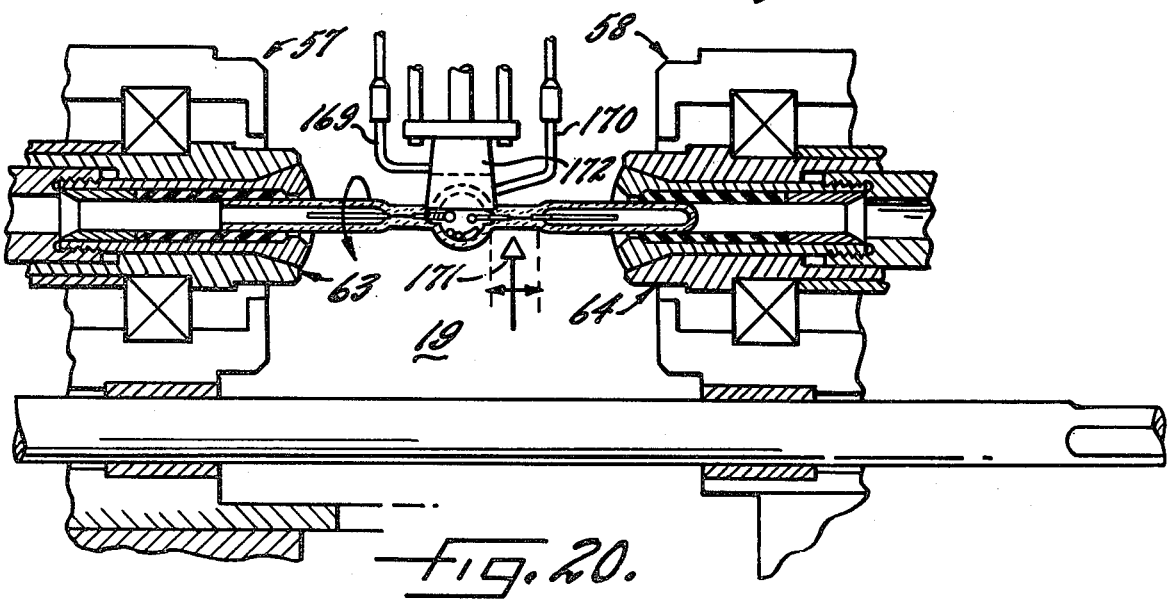

At station No. 19, the neck 35 is sealed to the anode 37 by a laser 171 similar to the laser 167 (see FIG. 20) while the bulb is cooled by water cooler 172 similar to that previously described. For some lamp sizes, it may be preferable to seal neck 35 first and then neck 34; this sequence permits a closer control of the argon pressure while making the last seal.

Figure 21:
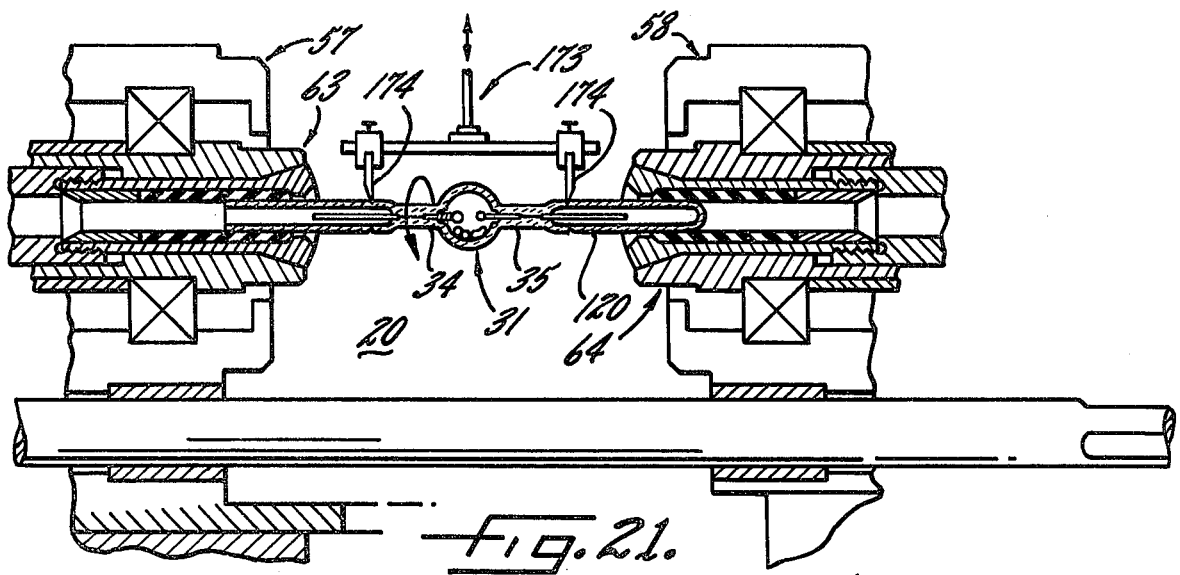

When the lathe 55 is indexed to station No. 20, a scoring head 173 (FIG. 21) having a pair of scoring tools 174 is advanced into an operative position adjacent the tube 120. The tools 174 are located to score the end portions of the necks 34 and 35 beyond the sealing regions so that the end portions subsequently may be broken away to expose the inleads 45 and 46.

Figure 22:
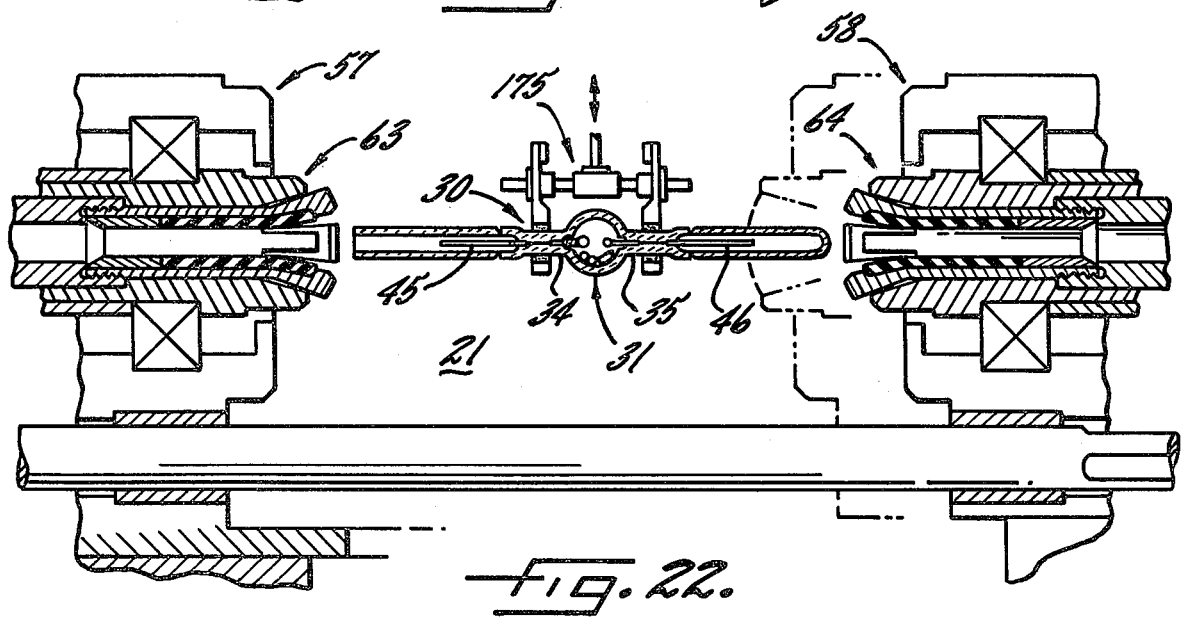

At station No. 21 (see FIG. 22), the lamp 30 is removed from the lathe 55. This may be achieved by retracting the headstock 58 from the lamp, by gripping the lamp with an automatically operable unloading device 175 and then by retracting the tailstock from the lamp. The empty lathe then may advance to the twelve o'clock position shown in FIG. 2 to receive another quartz tube and begin another cycle.

ALTERNATIVE PROCESSING SEQUENCE

The previously described processing sequence may be modified within the scope of our invention, and we have found it desirable to do so to facilitate handling of the halide material as tiny pellets or powder. We have described loading the halide pellets into the arc tube after the bulb has cooled and the electrode has been inserted into the upstream neck. If halide powder or tiny pellets are used, it is possible for some of it to work its way out of the arc tube due to the combination of bulb rotation and argon gas flush. The quantity of halide is critical and loss of any part will adversely affect lamp performance.

A minor modification in the processing sequence resolves the foregoing difficulty. We have found that if the halide material is introduced into the bulb while it is still hot, the material will melt and coat the wall and adhere to it upon cooling. More uniform coating is achieved if the bulb is also spinning when the material is introduced. This will prevent any subsequent loss of the charge of halide by being swept out with the flushing gas. We have found it best to introduce the halide material immediately after the operation of cleaning the lamp body by the heating and gas flushing performed at station number 8 (FIG. 11). This allows the heat remaining from the cleaning operation to be used and eliminates any need to reheat the bulb.

In our preferred alternative sequence, we clean the bulb at stations 8 and 9 using either a series of flames 138 as shown in FIG. 11, or a single flame traversed along the length of the lamp body, while argon is flushed through. Immediately following cleaning, station 10 is used for inspection. Then at station 11, nitrogen cooling gas is flowed over the rotating bulb in order to cool it to a temperature sufficient to cause melting of the halide but not much above that in order to avoid losses by vaporization. At the next station which is number 12, the halide material is introduced into the bulb, suitably through the use of tubular needle 153 (see FIG. 15) previously described. When the halide material contacts the hot bulb wall, it melts and the rotation of the bulb causes the liquid to spread. The halide remains adherent to the bulb wall upon cooling which is preferably done by a water spray at the next station, number 13. At station 14, mercury is dosed into the bulb, suitably through the use of needle 157 (FIG. 16) previously described. Then the upstream electrode, suitably the anode assembly, is inserted tip last (feet first) through the lamp body into the upstream neck. Next, at station 16, the cathode assembly is inserted tip first (head first) into the downstream neck. At station 15 the rotating tube is tipped off to form a temporary seal (see FIG. 18). In FIGS. 2 and 18, the tailstock is shown retracted at station 15 but it is optional whether or not the tailstock is retracted before tipping off. The processing is then completed in the same manner as previously described.

What we claim as new and desire to secure by Letters Patent of the United States is:

1. A method of manufacturing a lamp, said method comprising the steps of providing a lamp body having a hollow bulbous midportion with tubular neck portions projecting in opposite directions therefrom, inserting a first electrode tip last completely through one and into the other neck portion so that it remains supported solely by said other neck portion, inserting a second electrode tip first into said one neck portion so that it remains supported solely by said one neck portion at a predetermined spacing from the first electrode, and then sealing said electrodes into their respective neck portions.

2. A method as defined in claim 1 further including the step of inserting a dose of vaporizable material into said midportion preceding insertion of the second electrode.

3. A method as defined in claim 2 wherein non-reactive dry gas is flushed through said lamp body during said inserting steps.

4. A method as defined in claim 3 for making a lamp without resort to an exhaust tube wherein the dry gas is admitted into said body through said other neck portion and let out through said one neck portion.

5. A method of manufacturing a metal vapor lamp without resort to an exhaust tube, said method comprising the steps of, providing a lamp body having a hollow bulbous midportion with tubular neck portions projecting in opposite directions therefrom, heating said body while flowing inert dry gas into an upstream neck portion and out the downstream neck portion, and continuing the flow of gas while:
(a) inserting a first electrode tip last completely through the downstream neck portion and the midportion and into the upstream neck portion so that it remains supported solely by said upstream neck portion,
(b) inserting a dose of vaporizable material which is solid or liquid at ambient temperature through the downstream neck portion and into the midportion,
(c) inserting a second electrode tip first into the downstream neck portion so that it remains supported solely by said downstream neck portion at a predetermined spacing from the first electrode, the foregoing steps (a), (b) and (c) being performed in a sequence that makes (c) last, and then closing off the downstream neck portion and terminating the flow.

6. A method as defined in claim 5 performed with equipment which supports the lamp horizontally so that the dose introduced into said midportion, when released thereinto, falls along a path which is transverse to the flow of said gas.

7. A method as defined in claim 5 further including the steps of cooling said midportion, supplying inert dry gas at subatmospheric pressure to said body, and heat-sealing said electrodes into their respective neck portions.

8. A method of manufacturing a metal halide lamp without resort to an exhaust tube, said method comprising the steps of, providing (i) a lamp body having a hollow bulbous midportion with tubular neck portions projecting in opposite directions therefrom, and (ii) first and second electrode-inlead assemblies each having a tip adapted to be spaced from the tip of the other to define an arc gap therebetween, heating said body while rotating it about the axis of said neck portions and while flowing an inert gas into an upstream neck portion and out the other downstream neck portion, continuing the flow of gas while:
(a) inserting said first assembly tip last through the downstream neck portion and into the upstream neck portion and positioning said first assembly with its tip projecting a predetermined distance into the midportion, and inserting doses of metal halide and mercury through the downstream neck portion and transporting them upstream against the gas flow into the midportion,
(b) then inserting said second assembly tip first into the downstream neck portion and positioning said second assembly with its tip located in the midportion and spaced a predetermined distance from the tip of said first assembly, thereafter closing off the downstream neck portion thereby terminating the flow, supplying inert dry gas at subatmospheric pressure to said body, cooling said midportion, and heat-sealing the inlead portions of said assemblies into their respective neck portions.

9. A method of manufacturing a metal halide lamp without resort to an exhaust tube, said method comprising the steps of, providing a pair of spaced and axially aligned rotatable, horizontal chucks each adapted to selectively grip or release a fused silica tube, one of said chucks being adapted to move toward and away from the other, one of said chucks being inboard and having an inboard end selectively communicating with a presurized source of gas while the other is outboard, inserting a fused silica tube through the outboard end of the outboard chuck to locate it between the chucks, gripping the ends of said tube by both chucks, heating said tube while rotating it and while moving one chuck toward the other to gather material at the midportion of said tube, placing a mold alongside the material gathered at said midportion, inserting a closure into the outboard chuck to temporarily seal the downstream end of said tube from ambient atmosphere, introducing presurized gas into the upstream end of said tube through said inboard chuck while said tube is being rotated and heated, thereby to blow the material at the midportion of the tube into said mold and form the tube into a lamp body having a bulbous midportion with neck portions projecting in opposite directions therefrom, said method being characterized by the steps of, removing said closure and said mold, heating said lamp body while rotating it and flowing gas therethrough from said source to decontaminate said body, continuing the flow of gas while:
(a) inserting a first electrode-inlead assembly tip last through the downstream neck portion and into the upstream neck portion and positioning said first assembly with its tip projecting a predetermined distance into the midportion, and inserting doses of metal halide and mercury through the downstream neck portion and into the midportion,
(b) inserting a second electrode-inlead assembly tip first into the downstream neck portion and positioning said second assembly with its tip located in the midportion and spaced a predetermined distance from the tip of said first assembly, and
(c) closing off the downstream neck portion, then cooling said midportion, supplying inert dry gas at subatmospheric pressure to said body, and heat-sealing the inlead portions of said assemblies into their respective neck portions.

10. A method of manufacturing a discharge lamp to achieve precise determination of the electrode gap within a bulb, said method comprising the steps of:
seizing a tube of vitreous material in a glass lathe,
while the tube is so seized, making a lamp body out of the tube by forming a hollow bulbous midportion therein with tubular neck portions projecting in opposite directions, said bulbous midportion being precisely located relative to the lathe,
then, while maintaining the original seizure of the lamp body in the lathe, inserting an electrode into each neck portion, the tips of the electrodes being precisely located relative to the lathe whereby the length of the electrode gap and its location within the bulbous midportion are precisely determined,
and thereafter sealing said electrodes into their respective neck portions.

11. The method of claim 10 wherein the bulbous midportion is formed by heating the vitreous material in the midportion of the tube into the softening range and expanding it into a mold precisely located relative to the lathe.

12. The method of claim 10 wherein nonreactive dry gas is flushed through the lamp body during the inserting steps and the electrodes are moved upstream through the gas, one electrode being inserted tip last completely through one and into the other neck portion.

13. A method of manufacturing a discharge lamp to achieve precise determination of the electrode gap within a bulb together with high internal purity, said method comprising the steps of:

seizing a tube of vitreous material in a glass lathe and heating the midportion of the tube into the softening range while spinning it, while the tube is so seized, making a lamp body from it by forming the midportion while in the softening range into a hollow bulb having tubular neck portions projecting in opposite directions therefrom, said bulbous midportion being precisely located relative to the lathe, then extending the heating to the entire lamp body while continuing to spin it in the lathe and while flushing it with a nonreactive dry gas in order to remove moisture and other contaminants from the vitreous material at higher temperatures than will be encountered by said body during life after completion into a lamp, thereafter without altering the seizure of the lamp body in the lathe and while continuing the flushing, inserting electrodes into said lamp body in such manner that the tips of the electrodes are precisely located relative to the lathe whereby the length of the electrode gap and its location within the bulbous midportion are precisely determined, and finally sealing said lamp body and terminating the flushing.

14. The method of claim 13 wherein the bulbous midportion is formed by heating the vitreous material in the midportion of the tube into the softening range, gathering the material and then, while spinning the lamp body, expanding the bulbous midportion into a mold precisely located relative to the lathe.

15. A method as defined in claim 8 or 9 wherein the (a) steps are characterized by the fact that the metal halide dose is inserted into the midportion while the lamp body is spinning and is yet hot enough to melt the metal halide, the mercury dose is inserted after the lamp body has cooled enough to make the metal halide adherent to the bulb walls, and thereafter the first electrode-inlead assembly is inserted.

16. A method as defined in claim 5 or 13 wherein a metal halide dose is inserted into the midportion while the lamp body is yet hot enough to melt the metal halide, a mercury dose is inserted after the lamp body has cooled enough to make the metal halide adherent to the bulb walls, and thereafter the electrodes are inserted.

* * * * *